(12) United States Patent
Walia et al.

(10) Patent No.: US 9,011,577 B2
(45) Date of Patent: Apr. 21, 2015

(54) METHODS OF FILTERING MULTIPLE CONTAMINANTS, MITIGATING CONTAMINANT FORMATION, AND RECYCLING GREENHOUSE GASES USING A HUMIC AND FULVIC REAGENT

(71) Applicants: Daman S. Walia, Clifton, VA (US);
Ashok T. Jain, Sterling, VA (US);
Shinwoo Lee, Newark, DE (US)

(72) Inventors: Daman S. Walia, Clifton, VA (US);
Ashok T. Jain, Sterling, VA (US);
Shinwoo Lee, Newark, DE (US)

(73) Assignee: Arctech Inc., Chantilly, VA (US)

( * ) Notice: Subject to any disclaimer, the term of this patent is extended or adjusted under 35 U.S.C. 154(b) by 0 days.

(21) Appl. No.: 14/446,862

(22) Filed: Jul. 30, 2014

(65) Prior Publication Data
US 2015/0037274 A1 Feb. 5, 2015

Related U.S. Application Data

(60) Provisional application No. 61/860,110, filed on Jul. 30, 2013.

(51) Int. Cl.
*B01D 47/00* (2006.01)
*B01D 53/78* (2006.01)
*C02F 1/28* (2006.01)
*A01K 1/00* (2006.01)
*B01D 53/96* (2006.01)

(52) U.S. Cl.
CPC ............... *B01D 53/78* (2013.01); *C02F 1/283* (2013.01); *A01K 1/0047* (2013.01); *B01D 53/96* (2013.01); *B01D 2251/80* (2013.01)

(58) Field of Classification Search
USPC .......................................... 95/232
See application file for complete search history.

(56) References Cited

U.S. PATENT DOCUMENTS

| | | | | |
|---|---|---|---|---|
| 3,931,394 A | * | 1/1976 | Toyama et al. | ............. 423/576.7 |
| 8,580,979 B1 | | 11/2013 | Shulgin | |
| 2004/0149634 A1 | * | 8/2004 | Hughes | ........................ 210/96.1 |

* cited by examiner

*Primary Examiner* — Duane Smith
*Assistant Examiner* — Joubert X Glover

(57) ABSTRACT

A highly alkalized humic and fulvic filter reagent for the removal of multiple contaminants from a gas is provided. The contaminants removed from the gas stream may include, but are not limited to, Carbon Dioxide, Sulfur Oxide, Nitrogen Oxides, Hydrogen Sulfides, radionuclides, mercaptans, ammonia, toxic metals, particulates, volatile vapors, and organics. The present invention further includes the disposal of the filter reagent by way of using the highly alkalized humic and fulvic filter for soil fertility, releasing the carbon dioxide from the filter reagent, converting the liquid filter reagent into a solid for disposal or for use as a contaminant removal filter for waters, wastes, and chemicals.

10 Claims, 2 Drawing Sheets

METHODS OF FILTERING MULTIPLE CONTAMINANTS, MITIGATING CONTAMINANT FORMATION, AND RECYCLING GREENHOUSE GASES USING A HUMIC AND FULVIC REAGENT

CROSS-REFERENCE TO RELATED APPLICATION

This application claims the benefit of priority of U.S. provisional application No. 61/860,110, filed Jul. 30, 2013, the contents of which are herein incorporated by reference.

BACKGROUND OF THE INVENTION

The present invention relates to filtering gases and, more particularly, to a method of filtering and recycling harmful pollutants from gas sources using a humic and fulvic filter reagent Currently, different types of gases may cause pollution and unpleasant odors. Gas streams include multiple contaminants which are typically released into the atmosphere. Rue gas is the gas exiting to the atmosphere via a flue, which is a pipe or channel for conveying exhaust gases from a fireplace, oven, furnace, boiler, or steam generator. The flue gas is typically combustion exhaust gas produced at power plants. Flue gas composition depends on what is being burned, but it will usually include nitrogen, carbon dioxide, and water vapor as well as excess oxygen. The gas stream further contains pollutants, such as particulate matter (soot), carbon monoxide, nitrogen oxide, and sulfur oxides. Many of these gases may be harmful to the environment.

Poultry farming is the raising of domesticated birds such as chickens, turkeys, ducks, and geese, for the purpose of farming meat or eggs for food. In intensive broiler sheds, the aft can become highly polluted with ammonia from the droppings. This can damage the chickens' eyes and respiratory systems and can cause painful burns on their legs (called hock burns) and feet. Further, the ammonia may cause a foul odor, which may be unpleasant for the farmers and surrounding residents.

As can be seen, there is a need for a reagent for collecting harmful pollutants released by a variety of different gas sources.

SUMMARY OF THE INVENTION

In one aspect of the present invention, a method of filtering a gas comprises: passing the gas through a highly alkalized liquid filter reagent comprising a humic and fulvic substance.

In another aspect of the present invention, a method of filtration comprises: passing a gas stream through a highly alkalized liquid filter reagent comprising a humic and fulvic substance, forming a spent highly alkalized liquid filter reagent; and cross-linking the spent highly alkalized liquid filter reagent forming a solid filter.

In another aspect of the present invention, a method of removing odorous chemicals and microbes comprises: treating a chamber filled with a gas by spraying a highly alkalized liquid humic and fulvic filter reagent in the chamber, wherein the gas comprises odorous chemicals comprising ammonia, wherein the gas further comprises a plurality of microbes and spores, wherein the treatment lowers levels of ammonia and at least partially kills the plurality of microbes and spores.

These and other features, aspects and advantages of the present invention will become better understood with reference to the following drawings, description and claims.

DETAILED DESCRIPTION OF THE INVENTION

Figure 1:
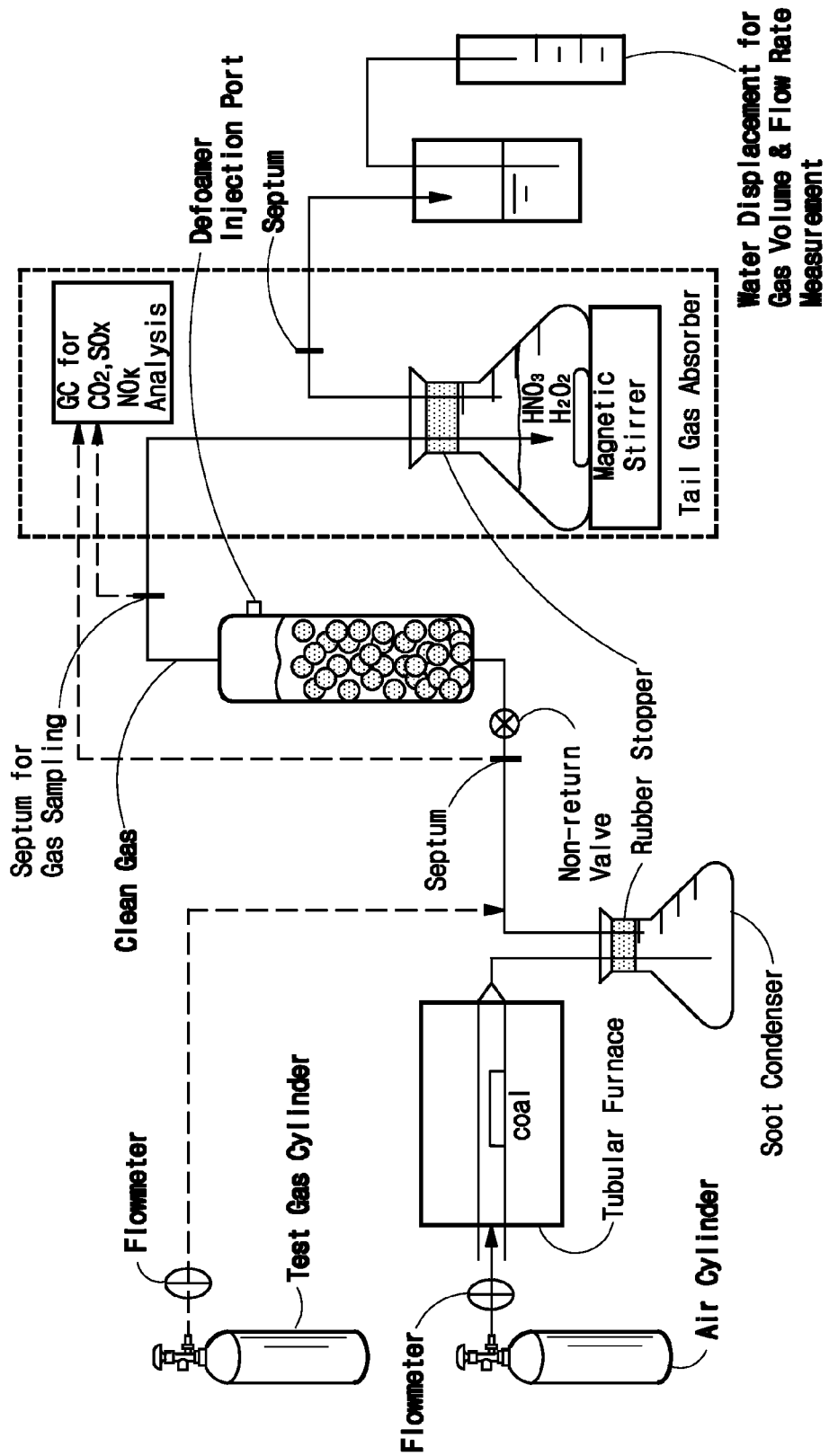
FIG. 1 is a schematic view of the filtration process of coal combustion gas and synthetic gas.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes the utilization of a natural organic reagent for the removal of multiple contaminants. The contaminants removed from the gas stream may include, but are not limited to, Carbon Dioxide, Sulfur Oxide, Nitrogen Oxides, Hydrogen Sulfides, mercaptans, ammonia, toxic metals, particulates, volatile vapors, and organics. The present invention further includes the disposal of the filter by way of using the natural organic filter for soil fertility, releasing the carbon dioxide from the filter, converting the liquid filter into a solid for disposal or for use as a contaminant removal filter for waters, wastes, and chemicals.

The natural organic reagent of the present invention is a highly alkalized reagent filter comprising a humic and fulvic substance which may be in a liquid form and then converted into a solid form. The liquid form of the humic and fulvic reagent filter is a unique and innovative approach for the capture of $CO_2$. Once the $CO_2$ has been captured, the liquid reagent may be converted into a solid filter for removing multiple contaminants from wastewater. The humic and fulvic reagent filter is a coal-derived organic humic liquid product proven feasible in bench scale tests for removal of 100% greenhouse gases (GHG) from coal combustion gases. Additionally, the humic and fulvic liquid filter reagent removes NOx, precursor nitrous oxides, which has around a 200 times higher GHG potential than $CO_2$, as well as SOx and toxic trace metals which result from combustion of fossil fuels, such as coal and oil. Removal of these multiple contaminants from combustion gases are accomplished by passing the gas through the liquid humic and fulvic reagent filter. The reagent can be sprayed co current to gas flow or counter current to gas flow as the gas is passed through a container. The present invention may also be deployed as a low cost treatment in a standalone tower reactor as well as offering a practical and cost effective approach for retrofitting the existing liquid reagent based SOx scrubbers commonly utilized for flue gas treatment.

The liquid filter reagent may be a coal-derived organic humic product. The liquid humic and fulvic reagent with its multiple functional groups comprises of carboxylic, hydroxyl, and enolic and its carbon matrix. The reagent includes multiple adsorption, chelation, and ion exchange properties and thus is able to bind with multiple organic and inorganic chemicals from various media. The used liquid reagent filter may then be crosslinked to form the solid filter for the treatment of water or chemicals. Due to the multiple binding sites, the solid filter has been successfully developed into a water filter for removal of multiple contaminants.

The humic and fulvic filter reagent is derived from Humic acid. Humic acid is a black to brown, highly functionalized, carbon rich macro-molecule. The structural makeup and properties of this chemical have been the subject of extensive research studies at various universities and research institutions throughout the world. The versatile characteristic properties of humic acid include: a high cation exchange capacity, the ability to chelate metals, the ability to adsorb organics, and a high water holding capacity. The humic acid molecule has been found to be remarkable in not only uniform chemical composition but also similar attributes in terms of ability to capture metal ions. It is a stable molecule and it is the fourth largest storehouse carbon in our planet after sedimentary rocks, fossil fuels and oceans. In addition, the organic humic matter in soils is terminal and does not further mineralize due to its unique molecular make up. The humic matter becomes soluble in highly alkaline solution and precipitates by protonation at pH <2. The associated minor components with it are referred to as fulvic acid which remains water soluble at all pH conditions.

Humic acid sources include coal, such as brown coal, peat, composts, and bottom sediments in lakes, rivers and the like. Production of the liquid humic and fulvic filter reagent involves extracting humic acid from coals which are rich in humic matter. The extraction of the humic acid may be performed with or without the use of microbes. An example of producing humic acid utilizing microbes may include the following. The process may include digestion of coals with aerobic microbes and then followed by extraction of water soluble humic acid under alkaline conditions. Coal may be treated with a consortium of microorganisms derived from termite guts and treated, herein designated Mic-1. The coal may be slurried with water by gentle mixing under aerobic conditions. The concentration of bacteria in the process may range from about 1 to about 20% by weight of the mixture of coal, water, and bacteria. The concentration of coal in the mixture can range from about 0.01% by weight to about 50% by weight of the mixture. The process may yield nearly a 95% conversion of humic adds in coal.

The extracted water soluble humic acid may be formulated into a highly alkalized humic and fulvic filter reagent with a specific humic acid content. For example, the humic acid may be mixed with an alkaline solution, such as, but not limited to, potassium hydroxide, sodium hydroxide, ammonium hydroxide, and the like. The mixture of the humic acid with the alkaline solution forms the highly alkalized humic and fulvic liquid filter reagent. In certain embodiments, the highly alkalized humic and fulvic liquid filter reagent may have a normality of about 0.5N to about 10N, about 1N to about 9N, about 2N to about 8N, about 3N to about 7N, about 4N to about 6N, or about 5N. The highly alkalized aspect of the humic and fulvic liquid filter reagent allows the filter to capture large amounts of $CO_2$ from the gas streams.

In certain embodiments, the capture of $CO_2$ and other greenhouse gases may be increased by the use of catalysts. Catalysts that may be used to improve $CO_2$ capture may include multifunctional solids such as, but is not limited to, zeolites, almumina, and the like. Further, transition metals may be used such as, but not limited to, cobalt, copper, nickel, zinc, vanadium, and the like. Further, transition metal complexes with ligands may be used such as, but not limited to, cyclen and cyclam.

As mentioned above, the humic and fulvic liquid filter reagent is used for removing multiple contaminants from gas streams. The humic acid may be prepared in high alkalinity, which aids in binding contaminants of concern from the combustion gases by passing the gases through the filter reagent. The Fourier transform infrared spectroscopy (FTIR) analysis of before and after verifies that the $CO_2$ is bound with the humic molecule and forms carbonate and bicarbonate and $CO_2$-humic acid complex organic compounds. Results from bench scale feasibility tests show the humic and fulvic filter reagent removed 0.7 kg per gallon as opposed to 0.2 kg per gallon with alkaline solution under the same conditions. Therefore, the present invention captured more than three times more $CO_2$ than the control. Also the NOx and SOx were captured due to high alkalinity of the present invention and toxic metals such as mercury, arsenic etc. become adsorbed on the humic molecule.

Once the liquid humic and fulvic filter reagent has been used to capture the contaminants of the gas stream, the spent liquid humic and fulvic filter reagent may be changed to the solid humic and fulvic filter. In such embodiments, the spent liquid humic and fulvic filter reagent may be polymerized or cross-linked. By cross-linking the liquid humic and fulvic filter reagent, a water-insoluble polymer is formed which lowers the solubility of the adsorbent as the pH is increased. The active groups of the humic acid may be protected by calcium. The cross-linked liquid humic and fulvic filter reagent has a low solubility in water after cross-linking at near neutral pH even in the presence of sodium ions.

Any conventional cross-linking agent can be used to cross-link the liquid humic and fulvic filter reagent to produce an insoluble solid humic and fulvic filter. Among the cross-linking agents that can be used to produce are aldehydes and oxidoreductase enzymes. These products showed significantly lower solubility at higher pH. For example, when glutaraldehyde or a mixture of glutaraldehyde and mineral acid (HCl, $HNO_3$, $H_2SO_4$, $H_3PO_4$, etc.) is used, the resulting cross-linked humic acid has a low solubility in water at near neutral pH in the presence of sodium ions.

Among the aldehydes that can be used for cross-linking humic acid are aliphatic or aromatic aldehydes having from 1 to 22 carbon atoms. The aldehydes may be substituted with any substituent that does not adversely affect the cross-linking capabilities of the aldehydes. The aldehydes may be saturated or unsaturated. The aldehyde may be an aromatic aldehyde, such as benzaldehyde, tolualdehyde (o-, m-, or p-) or salicylaldehyde. Any type of oxidoreductase enzyme can be used to cross-link the liquid humic and fulvic filter reagent, including peroxidases and hydrogenases.

The use of the converted solid humic and fulvic filter for removal of environmental contaminants from wastewaters relies on humic acid's multiple functional groups comprising of carboxylic, hydroxyl, and enolic and its carbon matrix, which impart its multiple adsorption, chelation, and ion exchange properties. Thus, the solid humic and fulvic filter is able to bind multiple organic and inorganic chemicals from various wastewater streams. Metals, such as nitrogen, oxygen or sulfur, are bound to the carbon skeleton of humic substances through heteroatoms. Metal binding occurs via carboxylic and phenolic oxygen. Further, the nitrogen and sulfur have a positive effect on metal binding. The solid humic and fulvic filter has high cation exchange capacity between 2 to 5 meq per gram. However, service life of the use of the solid humic and fulvic filter will depend on the concentration of contaminants in the wastewater.

The humic and fulvic filter reagent mentioned above may be used to remove pollutants from other gas sources. For example, the humic and fulvic filter reagent may remove odorous chemicals, such as ammonia, from poultry houses and the like. The ammonia may be released by the activity of microbes and chemicals. The present invention may capture the odorous chemicals in the air as well as eliminate the microbes and chemicals which are producing the odorous chemicals. The poultry houses and the like may be treated with the humic and fulvic liquid filter reagent by spraying the surfaces contaminated with chemical, biological and radionuclides, which in turn substantially reduces the odors and contaminants. Further, the reagent can be sprayed into the air contaminated with odorous chemicals, and thereby removing the odors and contaminants within the air.

It should be understood, of course, that the foregoing relates to exemplary embodiments of the invention and that modifications may be made without departing from the spirit and scope of the invention as set forth in the following claims.

Example 1

Tests were conducted with synthetic gas as well as with coal combustion gas. The schematic of the bench scale testing is illustrated in FIG. 1. The liquid humic and fulvic filter reagent was added to a column reactor filled with glass beads. The column reactor filled with the liquid humic and fulvic filter reagent and is kept at ambient conditions. The Synthetic gas premixed in a gas cylinder with a composition (weight %): $H_2$ 4.5%, CO 10%, $N_2$ 25%, $CO_2$ 30.5%, $CH_4$ 30% was passed from the bottom in the column reactor. Gas samples are taken from the septum before and after treatment for analysis for $CO_2$, $SO_x$ and $NO_x$ by gas chromatograph. The treated gas volume is measured by a water displacement method.

Figure 2:
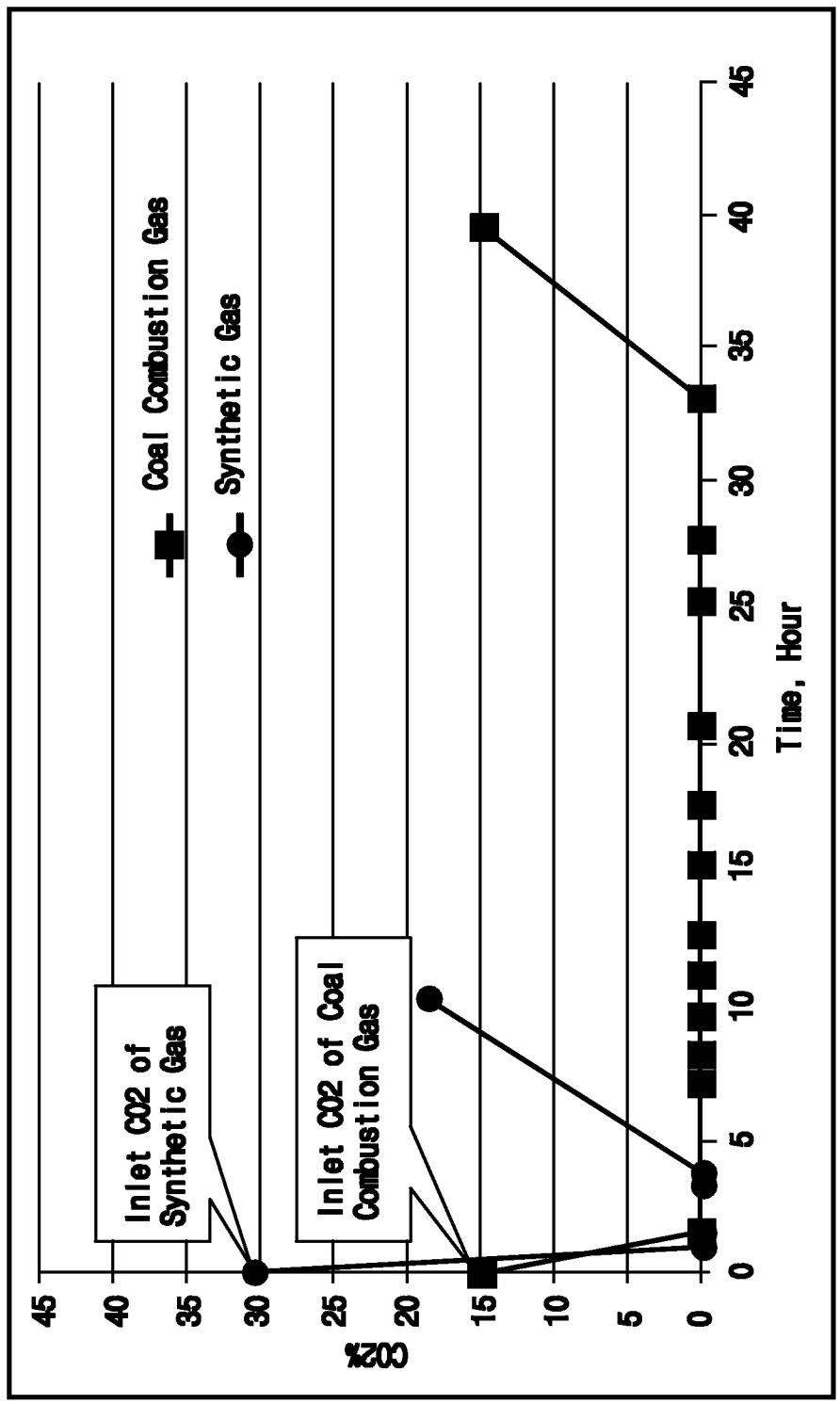
FIG. 2 shows the $CO_2$ absorption from coal combustion gas and synthetic gas by the humic and fulvic filter reagent of the present invention.

For tests with coals, the coal sample is combusted in a tube furnace heated at 800 degrees Celsius with air flowing into it from an air gas cylinder. The combustion gas is passed into a flask to remove any soot and then treated in the liquid humic and fulvic filter reagent column reactor. Both gas composition and gas volume are measured similar to tests with synthetic gas, except for analysis of toxic metals. The treated gas is allowed to bubble into oxidizing acid for capture of metals in the gas stream and then analyzed for metals using an Inductively Coupled Plasma. Tests with both low and high rank coal were conducted. The coal samples were also spiked with toxic metals: Arsenic, Cadmium, Chromium, Mercury and Lead to increase the concentration so that they will be present in the combustion gases at relatively high concentration than resulting from inherent in coal. This allowed analyzing even after using a small amount of coal combustion feasible in the experimental set up. Results of the Bench-scale proof of principal is illustrated in FIG. 2.

Example 2

For tests for odor, ammonia control and mitigation of their formation was tested by spraying the liquid humic and fulvic reagent on poultry litter in a closed chamber. The ammonia level first increased from average of 50 ppm to 100 ppm as the ammonia producing chemicals in the liter were hydrolysed and within 24 hours the ammonia level decreased to an average of 25 ppm level required to meet the regulatory limits. Also on analysis of the treated liter clostridia, spores and salmonella were eliminated which not only form odorous chemicals but also increase the diseases.

What is claimed is:

1. A method of filtration comprising:
   passing a gas stream through a highly alkalized liquid filter reagent comprising a humic and fulvic substance, forming a spent highly alkalized liquid filter reagent; and
   cross-linking the spent highly alkalized liquid filter reagent forming a solid filter.

2. The method of claim 1, wherein the highly alkalized liquid filter reagent is formed from a humic and fulvic acid in combination with an alkaline solution.

3. The method of claim 2, wherein the alkaline solution comprises potassium hydroxide, sodium hydroxide, ammonium hydroxide, or a combination thereof.

4. The method of claim 1, wherein the highly alkalized filter reagent removes a plurality of contaminants from the gas stream.

5. The method of claim 4, wherein the plurality of contaminants comprises Carbon Dioxide, Sulfur Oxide, Nitrogen Oxides, Hydrogen Sulfides, mercaptans, ammonia, radionuclides, toxic metals, particulates, volatile vapors, organics, or a combination thereof.

6. The method of claim 1, further comprising the step of filtering a water based substance using the solid filter.

7. The method of claim 1, wherein the highly alkalized liquid filter reagent comprises a normality greater than or equal to 0.5N.

8. A method of removing odorous chemicals and microbes comprising:
   treating a chamber filled with a gas by spraying a highly alkalized liquid humic and fulvic filter reagent in the chamber,
   wherein the gas comprises odorous chemicals comprising ammonia, wherein the gas further comprises a plurality of microbes and spores,
   wherein the treatment lowers levels of ammonia and at least partially kills the plurality of microbes and spores.

9. The method of claim 8, wherein the chamber is a poultry litter and the microbes comprise liter clostridia and salmonella.

10. The method of claim 1, wherein the highly alkalized liquid filter reagent comprises a catalyst comprising a multifunctional solid, a transition metal, a transition metal complex or a combination thereof.

* * * * *